(12) United States Patent
Butler

(10) Patent No.: US 11,671,796 B2
(45) Date of Patent: Jun. 6, 2023

(54) SYSTEM AND METHOD INTEGRATING VOICE RADIO SIGNALS WITH NETWORKED APPLICATIONS AND VOICE RECOGNITION

(71) Applicant: BearCom Group, Inc., Garland, TX (US)

(72) Inventor: Michael Butler, Arlington, TX (US)

(73) Assignee: BEARCOM GROUP, INC., Garland, TX (US)

( * ) Notice: Subject to any disclaimer, the term of this patent is extended or adjusted under 35 U.S.C. 154(b) by 5 days.

(21) Appl. No.: 17/375,305

(22) Filed: Jul. 14, 2021

(65) Prior Publication Data

US 2022/0022008 A1 Jan. 20, 2022

Related U.S. Application Data

(60) Provisional application No. 63/052,812, filed on Jul. 16, 2020, provisional application No. 63/052,537, filed on Jul. 16, 2020.

(51) Int. Cl.
*H04W 4/06* (2009.01)
*H04N 7/15* (2006.01)
*H04M 3/56* (2006.01)

(52) U.S. Cl.
CPC ............ *H04W 4/06* (2013.01); *H04M 3/568* (2013.01); *H04N 7/155* (2013.01); *H04M 2201/40* (2013.01)

(58) Field of Classification Search
None
See application file for complete search history.

(56) References Cited

U.S. PATENT DOCUMENTS

| | | | |
|---|---|---|---|
| 6,516,200 B1 * | 2/2003 | Schmidt | H04M 3/56 455/518 |
| 9,036,510 B1 * | 5/2015 | Zhou | H04M 1/72412 370/263 |
| 2008/0165245 A1 * | 7/2008 | Sarkar | H04M 3/569 348/14.09 |
| 2020/0394897 A1 | 12/2020 | Butler | |

* cited by examiner

*Primary Examiner* — Hemant S Patel
(74) *Attorney, Agent, or Firm* — Jeffer Mangels Butler & Mitchell LLP; Brennan C. Swain, Esq.

(57) ABSTRACT

A radio communication system integrating voice radio signals with an audio-video conference session that includes at least one two-way radio configured to wirelessly transmit and receive voice radio signals with a radio control station, a radio communication controller comprising a first audio interface, a second audio interface, and a radio control processor, and configured to transmit and receive audio signals with the radio control station through the first audio interface, and an audio-video conferencing system configured to transmit and receive audio signals with the radio communication controller through the second audio interface. A voice radio channel of the at least one two-way radio is provided to the audio-video conferencing system through the radio control station and the radio communication controller to participate in the audio-video conference session.

5 Claims, 4 Drawing Sheets

SYSTEM AND METHOD INTEGRATING VOICE RADIO SIGNALS WITH NETWORKED APPLICATIONS AND VOICE RECOGNITION

CROSS-REFERENCE TO RELATED APPLICATIONS

This application claims the benefit of U.S. Provisional Application No. 63/052,537, filed on Jul. 16, 2020 and U.S. Provisional Application No. 63/052,812, filed on Jul. 16, 2020, both of which are incorporated by reference herein in their entireties.

FIELD OF THE INVENTION

The present invention relates generally to a system related to push-to-talk radio with voice control.

BACKGROUND OF THE INVENTION

The use of traditional push-to-talk ("PTT") radios (e.g., two-way radios), including the use of many PTT radios, have been a staple of on-site work environment communications. Separately, audio-video conferencing systems have provided multi-user device-agnostic audio-video conference sessions for years. Moreover, Amazon, Google, Microsoft and now Apple all have developed voice recognition and control. The systems surrounding these product lines provide quick and easy voice access to information on the internet (example: Google Searches), as well as a complete line of sensors and controls. The normal and approved method of access for these systems is either a dedicated appliance (example: Echo Dot, Google Home Mini, Apple Home Pod) or a smart phone. However, these two technologies have not intersected.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first aspect of the present invention, there is provided a radio communication system integrating voice radio signals with an audio-video conference session that includes at least one two-way radio configured to wirelessly transmit and receive voice radio signals with a radio control station, a radio communication controller comprising a first audio interface, a second audio interface, and a radio control processor, and configured to transmit and receive audio signals with the radio control station through the first audio interface, and an audio-video conferencing system configured to transmit and receive audio signals with the radio communication controller through the second audio interface, wherein a voice radio channel of the at least one two-way radio is provided to the audio-video conferencing system through the radio control station and the radio communication controller to participate in the audio-video conference session. The first audio interface and/or the second audio interface may be wireless. The audio signals may be voice radio signals.

The audio-video conferencing system may be configured to enable an account configured to provide audio participation in the audio-video conference session to the at least one two-way radio during the audio-video conference session. The account is preferably set to automatically answer upon initiation of the audio-video conference session, as needed.

The radio control processor may be configured to add a delay to the voice radio channel for playback of the voice radio channel on the audio-video conferencing system during the audio-video conference session.

The audio channel of the audio-video conferencing system may also be provided to the at least one two-way radio. The radio control processor may be configured to add a delay to the audio channel for playback of the audio channel on the at least one two-way radio during the audio-video conference session.

A method of communicating voice audio between a two-way radio system and an audio-video conferencing system includes joining an audio-video conference session, monitoring a first audio interface to determine whether a voice audio signal is being received from the audio-video conferencing system and a second audio interface to determine whether a voice radio signal is being received from at least one two-way radio, upon receiving the voice audio signal from the audio-video conferencing system, transmitting the voice audio signal to at least one two-way radio after adding a delay to the voice audio signal when the voice radio signal is not determined as being received after a first predetermined time period, and upon receiving the voice radio signal from the at least one two-way radio, transmitting the voice radio signal to the audio-video conferencing system after adding a delay to the voice radio signal when the voice audio signal is not determined as being received after a second predetermined time period.

In accordance with another aspect of the present invention, there is provided a radio communication system including voice recognition that includes at least one radio receiver configured to wirelessly transmit and receive voice radio signals with a radio control station, a radio communication controller comprising a first audio interface, a second audio interface, and a radio control processor, and configured to transmit and receive audio signals with the radio control station through the first audio interface, and a voice recognition system configured to receive audio signals from the radio communication controller through the second audio interface and execute a command associated with the voice radio signals of the at least one two-way radio. For example, a confirmation in response to the command associated with the voice radio signals is received by the at least one two-way radio.

A method of communicating voice radio signals to a voice recognition system includes monitoring an audio interface to determine whether a voice radio signal is being received from at least one two-way radio, upon receiving the voice radio signal from the at least one two-way radio, transmitting the voice radio signal to the voice recognition system after adding a delay to the voice radio signal, and executing a command associated with the voice radio signal.

The method may further include receiving a confirmation in response to the command associated with the voice radio signals by the at least one two-way radio.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
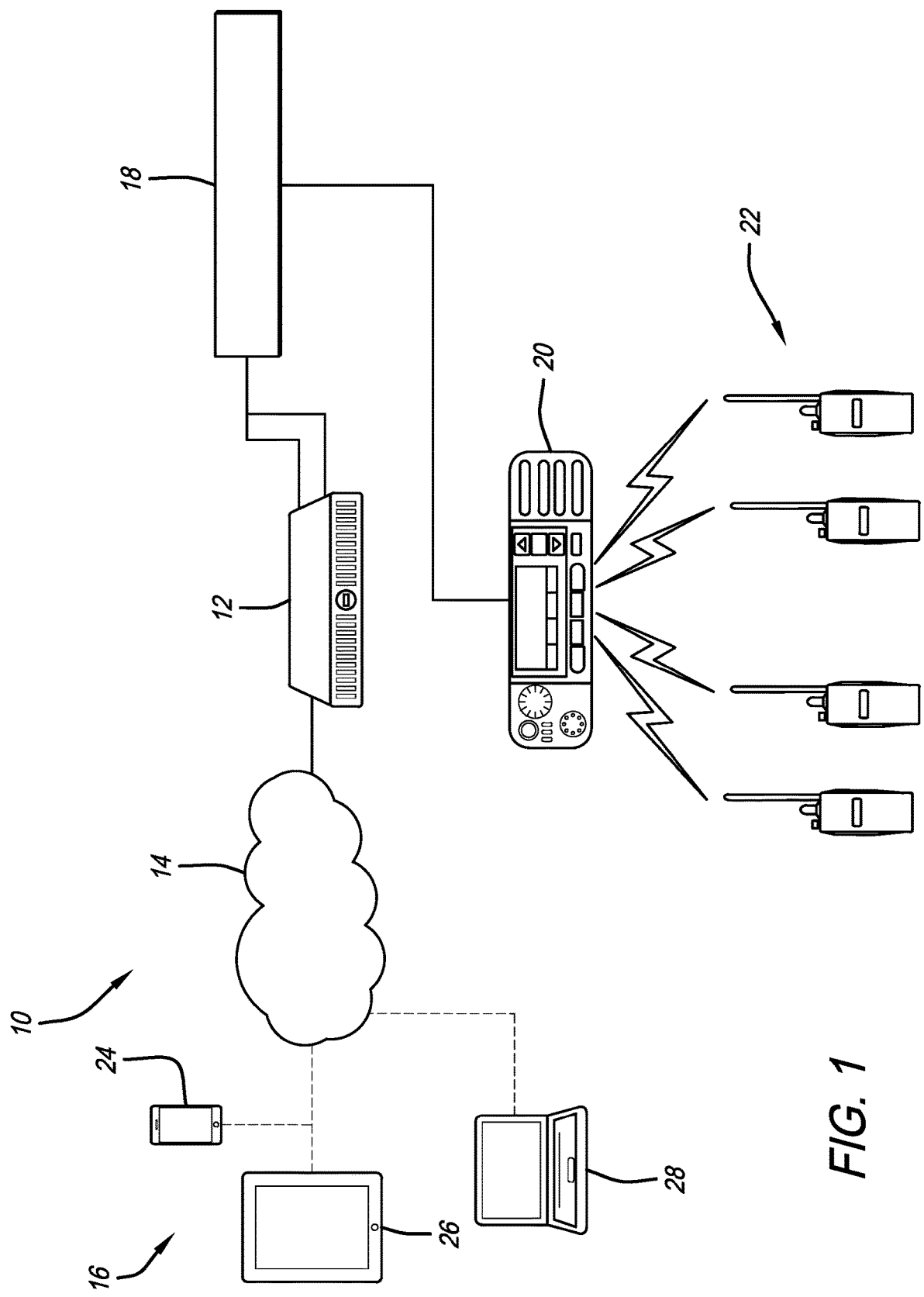
FIG. 1 is a system block diagram of a radio communication system in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

In a preferred embodiment of the present invention, functionality is implemented as software executing on a server that is in connection, via a network, with other portions of the system, including databases and external services. The server comprises a computer device capable of receiving input commands, processing data, and outputting the results for the user. Preferably, the server consists of RAM (memory), hard disk, network, central processing unit (CPU). It will be understood and appreciated by those of skill in the art that the server could be replaced with, or augmented by, any number of other computer device types or processing units, including but not limited to a desktop computer, laptop computer, mobile or tablet device, or the like. Similarly, the hard disk could be replaced with any number of computer storage devices, including flash drives, removable media storage devices (CDs, DVDs, etc.), or the like.

The network can consist of any network type, including but not limited to a local area network (LAN), wide area network (WAN), and/or the internet. The server can consist of any computing device or combination thereof, including but not limited to the computing devices described herein, such as a desktop computer, laptop computer, mobile or tablet device, as well as storage devices that may be connected to the network, such as hard drives, flash drives, removable media storage devices, or the like.

The storage devices (e.g., hard disk, another server, a NAS, or other devices known to persons of ordinary skill in the art), are intended to be nonvolatile, computer readable storage media to provide storage of computer-executable instructions, data structures, program modules, and other data for the mobile app, which are executed by CPU/processor (or the corresponding processor of such other components). The various components of the present invention, are stored or recorded on a hard disk or other like storage devices described above, which may be accessed and utilized by a web browser, mobile app, the server (over the network), or any of the peripheral devices described herein. One or more of the modules or steps of the present invention also may be stored or recorded on the server, and transmitted over the network, to be accessed and utilized by a web browser, a mobile app, or any other computing device that may be connected to one or more of the web browser, mobile app, the network, and/or the server.

References to a "database" or to "database table" are intended to encompass any system for storing data and any data structures therein, including relational database management systems and any tables therein, non-relational database management systems, document-oriented databases, NoSQL databases, or any other system for storing data.

Software and web or internet implementations of the present invention could be accomplished with standard programming techniques with logic to accomplish the various steps of the present invention described herein. It should also be noted that the terms "component," "module," or "step," as may be used herein, are intended to encompass implementations using one or more lines of software code, macro instructions, hardware implementations, and/or equipment for receiving manual inputs, as will be well understood and appreciated by those of ordinary skill in the art. Such software code, modules, or elements may be implemented with any programming or scripting language such as C, C++, C#, Java, Cobol, assembler, PERL, Python, PHP, or the like, or macros using Excel or other similar or related applications with various algorithms being implemented with any combination of data structures, objects, processes, routines or other programming elements.

Referring now to the drawings, which are for purposes of illustrating the present invention and not for purposes of limiting the same, the drawings show a radio communication system in which two-way radio systems are integrated with networked applications and voice recognition systems. FIG. 1 is system block diagram of a radio communication system 10 in accordance with a preferred embodiment of the present invention. The radio communication system 10 includes a personal computer 12, a cloud server 14, peripherals 16, a radio communication controller 18, a radio control station 20, and at least one two-way radio 22 or push-to-talk ("PTT") radio 22 (or a plurality of two-way radios 22).

For example, the personal computer 12 is configured to run both local and networked applications. As described herein, networked applications may be available via a cloud, such as depicted in the cloud server 14. One of ordinary skill in the art would understand the components and functions of a cloud server, all of which may vary and are within the general scope of the present invention.

The personal computer 12 may be preloaded with audio-video conferencing system software such as Skype, Zoom, or the like. In an embodiment of the present invention, a radio channel is included in and participates in audio-video conference sessions, video calls, or the like, such as Skype calls thru Amazon Alexa, Zoom, or Cisco Webex. The system also works with Zoom meetings, Cisco WebEx and any online video or audio conferencing platform. It will be appreciated that Skype calls and Zoom meetings typically require a PC 12 with the application and the account to get started. In an embodiment, the conferencing account must be set to auto answer, which both Skype and Zoom offer. A radio communication controller 18 combined with the radio control station 20 with bidirectional audio connections permits adding radio channels to online conferencing applications, including the aforementioned.

In an embodiment, the personal computer 12 may also be capable of voice recognition or be networked to provide access to voice recognition systems and software as provided by, for example, Amazon, Google, Microsoft and Apple. In an embodiment, the personal computer 12 is an Alexa-enabled device (or similar system to Alexa, such as Google assistant, etc.). The personal computer 12 may be any artificial intelligence ("AI")-enabled system utilizing voice recognition or control.

In an embodiment of the present invention, a PTT radio 22 or the like is provided together with voice recognition and control or other AI access. By combining these two technologies it is possible, for example, to access any information on the internet using a voice and the PTT radio 22 or to control or access remote control switches, thermostats, power and security sensors from any radio at any location with no restrictions on distance.

For example, the types of technologies that can be used with PTT include, for example, the technologies used with the following products and/or brands: Chromecast, Nest, SmartThings, Phillips Hue, LIFX Smart Lights, TP-Link Smart Home, Vivint Home Security, Rachio Sprinklers, Logitech Harmony, Geeni Connected Tech, August Smart Locks, iHome Control, Hive Home Automation, Honeywell, NuBryte Smart Home Automation, Smartika, AWAIR Air Filtration, Keako Smart Switches and Nanoleaf Aurora Light Panels, among others. Wireless PTT radio with AI voice assistants is also within the scope of the present invention. Each of the foregoing technologies may be the personal computer 12.

As an example, in a distribution center environment, doors, lights and other devices can be voice controlled. Equipment operators can call the door on the PTT radio 22 and ask it to open. Lights can be left off and turned on only when needed. Security personnel can have motion sensors call them on the PTT radio 22 when a secure area needs to be checked for activity.

Manufacturing facilities can use voice control on doors, devices, and environmental controls using the traditional two-way radios 22. At a hotel/resort, irrigation, security, and access control could be voice controlled on the two-way radios 22.

An Alexa-enabled device utilizing Alexa for Business may also provide PTT radio 22 users with access to meeting room calendaring, meeting room efficiency, private skills, voice-enabled applications such as Salesforce, ServiceNow, or any custom apps and services, or the like.

In practice, a retailer provides PTT radios 22 for the staff in a store. The company has implemented an Alexa-enabled device 12 inside the store with access to the store's online inventory. The Alexa-enabled device 12 is associated with the store and has access to a radio communication system 10 including PTT radios 22. A sales associate requesting an inventory check may use their PTT radio 22 to ask Alexa to determine if the local store has available stock for the particular good sought by the shopper without leaving the shopper's presence.

The radio communication system 10 preferably includes peripherals 16 such as a mobile phone 24, a tablet 26, a laptop 28, a personal computer 12, or the like. Each of the peripherals 16 is configured to operate an audio-video conferencing system.

The radio communication system 10 preferably includes a radio communication controller 18. The radio communication controller 18 is configured to provide audio interfaces between different audio platforms, including analog and digital radio systems. The radio communication controller 18 is also configured to receive voice radio signals, add a delay to the voice radio signals, and transmit the voice radio signals to a different audio platform. For example, an audio delay is 200-250 milliseconds in duration. The radio communication controller 18 preferably monitors its audio inputs to determine whether it is receiving voice audio signals. In practice, the radio communication controller 18 ensures that while voice radio signals from the two-way radios 22 are being received and relayed on by the radio control station 20, that voice audio signals from the personal computer 12 (or networked application) are not transmitted. Further, once the radio communication controller 18 determines that voice radio signals have ceased being received, after a predetermined time period, either the voice radio signals or the voice audio signals may be received and transmitted. Of course, if the radio communication controller 18 determines that voice audio signals from the personal computer 12 are being received, the radio communication controller 18 will relay those signals via the radio control station 20 to the two-way radios 22. During the time that a transmission occurs, therefore, the radio communication controller 18 will prohibit the voice audio signals or the voice radio signals from being transmitted, as applicable. One of ordinary skill in the art would understand that when only voice audio signals (i.e., not voice radio signals from a radio transceiver or two-way radio, or the like) are being received by the audio-video conferencing system during an audio-video conference session, then normal operation of the video conference would occur.

There is no limit on what radio protocol is supported by the radio communication controller 18. For example, see U.S. Patent Pub. No. 2020/0394897, the entirety of which is incorporated herein by reference. For example, the radio communication controller 18 may include functionality and/or components implemented in various dual-channel interoperability gateways, such as the JPS Interoperability Solutions' RPS-Z2 or the like.

The radio control station 20 preferably includes an audio interface 25 and radio connectivity 27 to the two-way radios 22. The radio control station 20 may be any of a variety of control stations configured to transmit and receive radio signals with two-way radios 22.

The two-way radios 22 may be any of a variety of two-way radios 22 or PTT radios 22. For example, the two-way radios 22 may be Motorola two-way radios 22.

Figure 2:
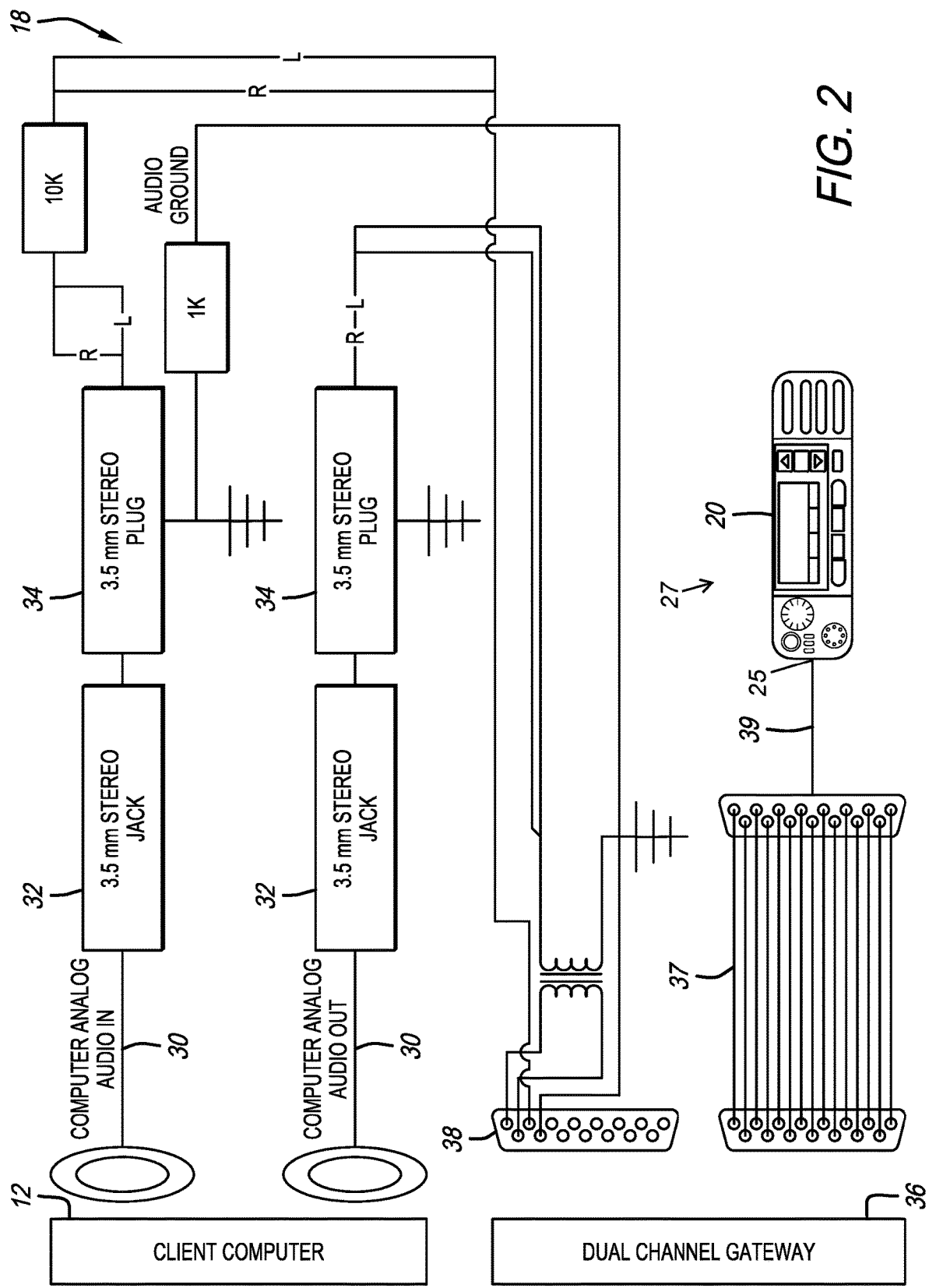
FIG. 2 is a system block diagram of various components of a radio communication system in accordance with a preferred embodiment of the present invention.

FIG. 2 is a system block diagram of various components of a radio communication system 10 in accordance with a preferred embodiment of the present invention. FIG. 2 includes a client computer 12, a radio communications controller 18, and a radio control station 20.

The client computer 12 may be the personal computer 10 of FIG. 1 or any variety of devices described herein as suitable replacements for the personal computer 12. The client computer 12 depicted in FIG. 2 includes audio inputs/outputs 30 (i.e., computer analog audio in 30/computer analog audio out 30). Also depicted are 3.5 mm stereo jacks 32 to receive 3.5 mm stereo plugs 34. The 3.5 mm stereo jacks are integrated with and part of the client computer 12. The 3.5 mm stereo plugs 34 are designed to be mated with the 3.5 mm stereo jacks 32 and provide an analog audio connection between the client computer 12 and the radio communication controller 18. It will be appreciated that the size and types of jacks are only exemplary and not limiting.

The radio communication controller 18 in FIG. 2 includes a dual channel gateway 36. The dual channel gateway 36 includes a channel interface 37 between the dual channel gateway 36 and the radio control station 20 via an access control unit cable 39. The dual channel gateway 36 also includes a dual channel audio interface 38 to provide the analog audio connection between the client computer 12 and the radio communication controller 18. Right and left channels from the dual channel audio interface 38 feed to the 3.5 mm stereo plugs 34. As shown in FIG. 2, the right and left computer analog audio out channels feed directly to provide analog audio from the client computer 12 to the radio communication controller 18. The right and left computer analog audio in channels, on the other hand, are provided using a 1K-ohm resistor to audio ground, and a 10K-ohm resistor to the right and left channels.

The radio communication controller 18 provides an audio delay for analog audio traveling to the client computer 12 or analog audio traveling to the two-way radios 22.

As one of ordinary skill will appreciate, FIG. 2 depicts an analog solution to integrating voice radio signals with audio-video conferencing, voice recognition, or other applications. However, one of ordinary skill in the art would understand that these systems could be implemented to provide for a digital solution without departing from the scope of the present invention.

Figure 3:
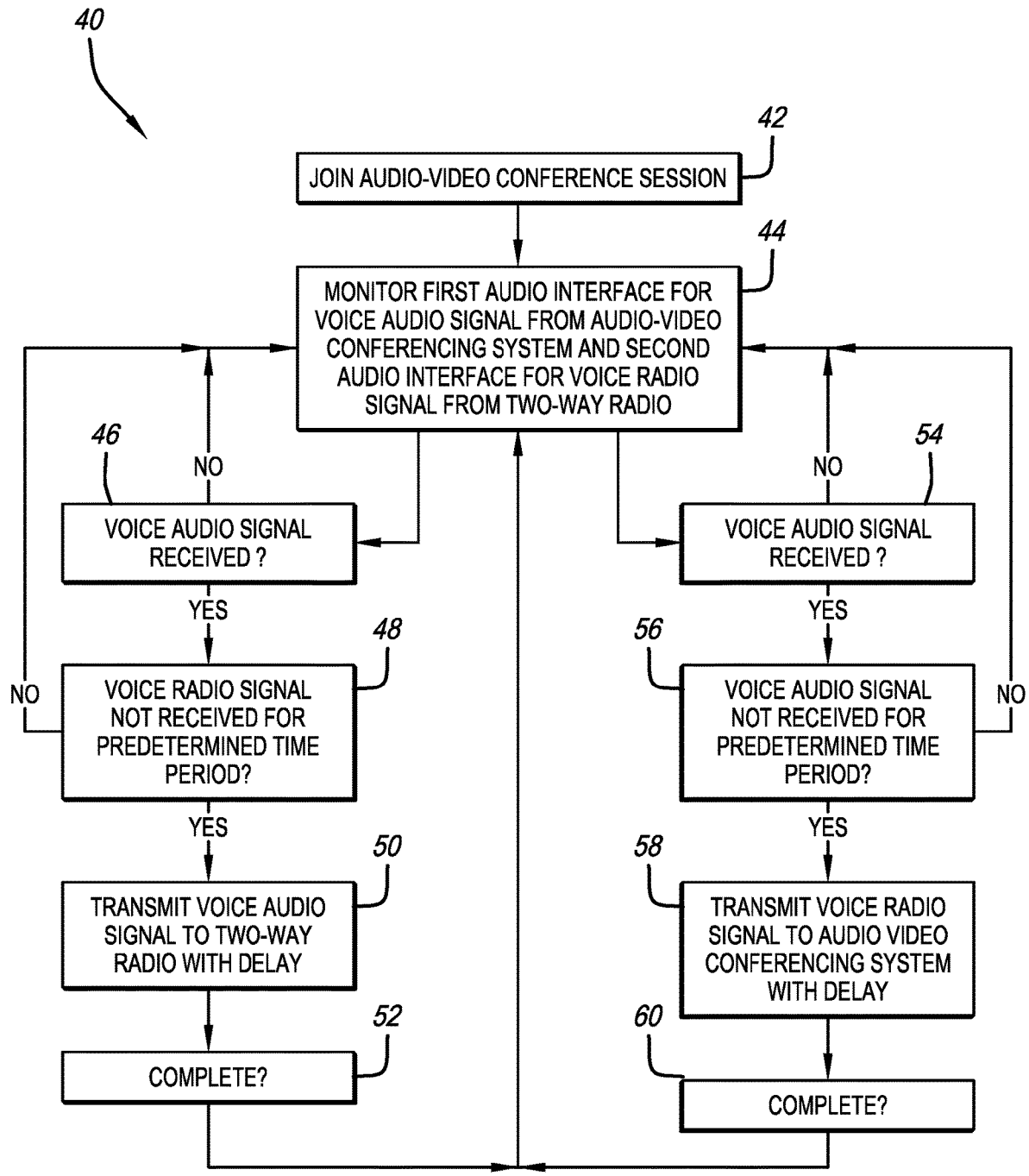
FIG. 3 is a flow diagram of a method of communicating voice audio between a two-way radio system and an audio-video conferencing system in accordance with a preferred embodiment of the present invention.

FIG. 3 is a flow diagram of a method 40 of communicating voice audio between a two-way radio system and an audio-video conferencing system in accordance with a preferred embodiment of the present invention.

At Step 42, an audio-video conference session is joined. As described herein, upon initiation of an audio-video conference by a user, and the user's selection of two-way radios 22 (i.e., a group of two-way radio 22 users), the two-way radios 22 are automatically joined. A two-way radio 22 may not have the capability of selecting "join" to an audio-video conference session. Thus, in certain audio-video conferencing systems, a user initiating the session may select "auto join" to ensure that all two-way radio 22 users are joined to the session. In other systems, a user may select two-way radio 22 users and they will be automatically added to any session without the need for an "auto join" function.

At Step 44, a first audio interface (e.g., from computer analog audio out 30 to dual channel audio interface 38) is monitored for a voice audio signal from the audio-video conferencing system. A second audio interface (e.g., from channel interface 37 to the radio control station 20 via access control unit cable 39) is monitored for a voice radio signal from the two-way radios 22. The voice audio signal in an embodiment is a voice radio signal. For example, a voice radio signal may be different from a voice audio signal.

At Step 46, it is determined whether a voice audio signal has been or is currently being received from the audio-video conferencing system. If the answer is "No", then the first and second audio interfaces continue to be monitored in accordance with Step 44. If the answer is "Yes," then Step 48 is performed.

At Step 48, it is determined whether a voice radio signal was not received for a predetermined time period. One of ordinary skill in the art would understand that various predetermined time periods could be chosen depending on the desired results. However, due to usage of PTT or two-way radios 22, it is beneficial to ensure that a communication to or from the two-way radios 22 is not cut short by transmission of a voice audio signal from the audio-video conferencing system. If the answer is "No", then the first and second audio interfaces continue to be monitored in accordance with Step 44. If the answer is "Yes," then Step 50 is performed.

At Step 50, the voice audio signal is transmitted to the two-way radios 22. Preferably the voice audio signal is transmitted to the two-way radios with a delay due to use of PTT radios 22.

At Step 52, if the transmission is complete, then the first and second audio interfaces continue to be monitored in accordance with Step 44.

At Step 54, it is determined whether a voice radio signal has been or is being received from a two-way radio 22. If the answer is "No", then the first and second audio interfaces continue to be monitored in accordance with Step 44. If the answer is "Yes," then Step 50 is performed.

At Step 56, it is determined whether a voice audio signal was not received for a predetermined time period. One of ordinary skill in the art would understand that various predetermined time periods could be chosen depending on the desired results. However, due to usage of PTT or two-way radios 22, it is beneficial to ensure that a communication to or from the two-way radios 22 is not cut short by transmission of a voice audio signal from the audio-video conferencing system, or vice versa. If the answer is "No", then the first and second audio interfaces continue to be monitored in accordance with Step 44. If the answer is "Yes," then Step 58 is performed.

At Step 58, the voice radio signal is transmitted to the audio-video communication system. Preferably the voice radio signal is transmitted to the two-way radios with a delay due to use of PTT radios 22.

At Step 60, if the transmission is complete, then the first and second audio interfaces continue to be monitored in accordance with Step 44.

Figure 4:
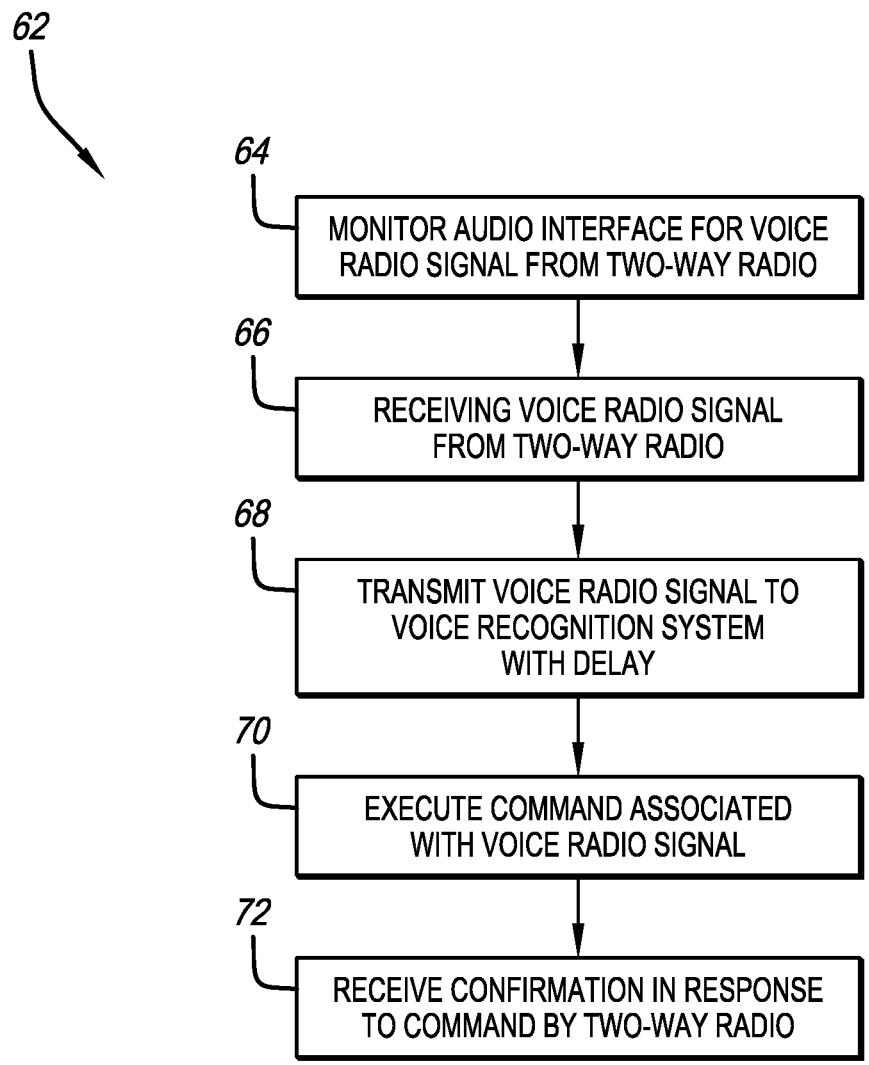
FIG. 4 is a flow diagram of a method of communicating voice audio to a voice recognition system in accordance with a preferred embodiment of the present invention.

FIG. 4 is a method 62 of communicating voice audio to a voice recognition system in accordance with a preferred embodiment of the present invention.

At Step 64, an audio interface (e.g., from channel interface 37 to the radio control station 20 via access control unit cable 39) is monitored for a voice radio signal from the two-way radios 22.

At Step 66, a voice radio signal is received from the two-way radios 22.

At Step 68, the voice radio signal is transmitted to a voice recognition system with a delay. Preferably the voice radio signal is transmitted to the two-way radios with a delay due to use of PTT radios 22.

At Step 70, a command associated with the voice radio signal is executed. For example, the voice radio signal could be, as described above, a request for Alexa to provide information. In other examples, the voice radio signal could be a command to a remote sensor (e.g., security sensors) or a variety of other sensors or systems as described herein.

At Step 72, a confirmation message is received in response to the command, by the two-way radios 22. In an example, when the voice radio signals requested information of Alexa, the Alexa AI voice recognition and control system provides a response to the two-way radios 22. In the system block diagrams of FIGS. 1-2, the radio communication controller receives the message, adds a delay to the message, and transmits the message to the radio control station 20, which then passes along the message to the two-way radios 22.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A radio communication system integrating voice radio signals with an audio-video conference session, the radio communication system comprising:
    at least one two-way radio configured to wirelessly transmit and receive voice radio signals with a radio control station,
    a radio communication controller comprising a first audio interface, a second audio interface, and a radio control processor, and configured to transmit and receive audio signals with the radio control station through the first audio interface, and
    an audio-video conferencing system configured to transmit and receive audio signals with the radio communication controller through the second audio interface,
    wherein a voice radio channel of the at least one two-way radio is configured to be provided to the audio-video conferencing system and an audio channel of the audio-video conferencing system is configured to be provided to the at least one two-way radio through the radio control station and the radio communication controller to participate in the audio-video conference session,
    wherein upon receiving the audio signal from the audio-video conferencing system, the radio control processor is configured to transmit the audio signal to the at least one two-way radio after adding a delay to the audio signal when the voice radio signal is not determined as being received after a first predetermined time period, and upon receiving the voice radio signal from the at least one two-way radio, the radio control processor is configured to transmit the voice radio signal to the audio-video conferencing system after adding a delay to the voice radio signal when the audio signal is not determined as being received after a second predetermined time period.

2. The radio communication system of claim 1 wherein the audio signals are voice radio signals.

3. The radio communication system of claim 1 wherein the audio-video conferencing system is configured to enable an account configured to provide audio participation in the audio-video conference session to the at least one two-way radio during the audio-video conference session.

4. The radio communication system of claim 3 wherein the account is set to automatically answer upon initiation of the audio-video conference session.

5. A method of communicating voice audio between a two-way radio system and an audio-video conferencing system, the method comprising the steps of:
    joining an audio-video conference session;
    monitoring a first audio interface to determine whether a voice audio signal is being received from the audio-video conferencing system and a second audio interface to determine whether a voice radio signal is being received from at least one two-way radio,
    upon receiving the voice audio signal from the audio-video conferencing system, transmitting the voice audio signal to at least one two-way radio after adding a delay to the voice audio signal when the voice radio signal is not determined as being received after a first predetermined time period, and
    upon receiving the voice radio signal from the at least one two-way radio, transmitting the voice radio signal to the audio-video conferencing system after adding a delay to the voice radio signal when the voice audio signal is not determined as being received after a second predetermined time period.

* * * * *